United States Patent
Persson et al.

(10) Patent No.: US 10,506,562 B2
(45) Date of Patent: Dec. 10, 2019

(54) COMMUNICATIONS LINK CONFIGURATION

(71) Applicant: TELEFONAKTIEBOLAGET L M ERICSSON (PUBL), Stockholm (SE)

(72) Inventors: Anders Persson, Kode (SE); Roland Carlsson, Ojersjo (SE); Henrik Sahlin, Molnlycke (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1191 days.

(21) Appl. No.: 13/883,410

(22) PCT Filed: Apr. 29, 2013

(86) PCT No.: PCT/EP2013/058902
§ 371 (c)(1),
(2) Date: May 3, 2013

(87) PCT Pub. No.: WO2014/173465
PCT Pub. Date: Oct. 30, 2014

(65) Prior Publication Data
US 2014/0321318 A1    Oct. 30, 2014

(30) Foreign Application Priority Data
Apr. 26, 2013 (WO) .................. PCT/EP2013/058684

(51) Int. Cl.
*H04L 12/24* (2006.01)
*H04W 72/04* (2009.01)

(52) U.S. Cl.
CPC .............................. *H04W 72/0413* (2013.01)

(58) Field of Classification Search
CPC ..................... H04W 72/0413; H04W 28/02
See application file for complete search history.

(56) References Cited

U.S. PATENT DOCUMENTS 8,340,678 B1 * 12/2012 Pandey ................ H04W 72/04
370/468
2010/0272006 A1   10/2010 Bertrand et al.
(Continued)

FOREIGN PATENT DOCUMENTS

EP    2362708 A1    8/2011
EP    2398160 A2    12/2011
(Continued)

OTHER PUBLICATIONS

International Search Report and the Written Opinion of the International Searching Authority dated Apr. 28, 2014, in International Application No. PCT/EP2013/058902, 20 pages.
(Continued)

*Primary Examiner* — Gbemileke J Onamuti
(74) *Attorney, Agent, or Firm* — Rothwell, Figg, Ernst & Manbeck, P.C.

(57) ABSTRACT

There is provided configuration of a communications link. The configuration involves wirelessly receiving control signalling from a user equipment by a network node functional unit. The control signalling relates to an uplink communications resource between the user equipment and the network node functional unit. The configuration further involves notifying, in response to receiving the control signalling and prior to receiving any user data associated with the control signalling from the user equipment on the uplink communications resource, a backhaul client functional unit to configure a communications link to a backhaul hub.

32 Claims, 12 Drawing Sheets

(56) References Cited

U.S. PATENT DOCUMENTS

| | | |
|---|---|---|
| 2010/0272007 A1 | 10/2010 | Shen et al. |
| 2013/0336200 A1* | 12/2013 | Andreozzi ........ H04W 72/1226 370/315 |
| 2014/0162666 A1* | 6/2014 | Ratasuk ............ H04W 72/0486 455/450 |

FOREIGN PATENT DOCUMENTS

| | | |
|---|---|---|
| GB | 2454872 A | 5/2009 |
| GB | 2481715 A | 1/2012 |
| WO | 2011126437 A1 | 10/2011 |
| WO | 2012116754 A1 | 9/2012 |

OTHER PUBLICATIONS

Ericsson, "Resource State Measurements for RNs" 3GPP TSG-RAN WG3 #74, R3-113005, 2011, 2 pages.
International Preliminary Report on Patentability, issued in corresponding International Application No. PCT/EP2013/058902, dated Jun. 10, 2015, 24 pages.
European Communication dated Oct. 8, 2018, issued in European Patent Application No. 13721938.2, 6 pages.
Office Action dated Nov. 16, 2017, issued in Mexican Patent Application No. MX/a/2015/014822, 4 pages.

* cited by examiner

COMMUNICATIONS LINK CONFIGURATION

TECHNICAL FIELD

Embodiments presented herein relate to mobile communication networks, and particularly to a method, a user equipment and a computer program for configuring a communications link in a mobile communication network.

BACKGROUND

In mobile communication networks, there is always a challenge to obtain good performance and capacity for a given communications protocol, its parameters and the physical environment in which the mobile communication network is deployed.

Wireless backhaul is a proven technology for connecting network nodes such as radio base stations to the backbone network. The communications between the network node and the backbone network occurs between a backbone client provided at the network node and a backbone hub provided at the backbone network. Point-to-point microwave links have been used to provide this connectivity. Lately, so-called Point-to-MultiPoint (P2MP) systems have been considered. In P2MP systems one backhaul hub often provides connectivity to more than one backbone client. Such P2MP systems thus impose the need for multiplexing of more than one backhaul client. In a case there is a wireless communications link between the backbone client and the backbone hub a scheduled air interface is needed.

Hence, there is still a need for an improved backhaul communications.

SUMMARY

An object of embodiments herein is to provide improved backhaul communications.

The inventors of the enclosed embodiments have realized that one parameter characteristic for backhaul communications is the data transmission delay that the backhaul results in. A particular object is therefore to provide improved backhaul communications by reducing the data transmission delay.

According to a first aspect there is presented a method for configuring a communications link. The method is performed by a network node functional unit. The method comprises wirelessly receiving control signalling from a user equipment. The control signalling relates to an uplink communications resource between the user equipment and the network node functional unit. The method comprises notifying, in response to receiving said control signalling and prior to receiving any user data associated with said control signalling from said user equipment on said uplink communications resource, a backhaul client functional unit to configure a communications link to a backhaul hub.

Advantageously this reduces the uplink data delay over a wireless backhaul. Advantageously this also reduces the time to prepare the backhaul for data transmission (i.e. to switch the backhaul from "idle mode" to "connected mode").

According to a second aspect there is presented a network node for configuring a communications link. The network node comprises a network node functional unit. The network node functional unit is arranged to wirelessly receive control signalling from a user equipment. The control signalling relates to an uplink communications resource between the user equipment and the network node functional unit. The network node functional unit is arranged to notify, in response to receiving the control signalling and prior to receiving any user data associated with the control signalling from the user equipment on the uplink communications resource, a backhaul client functional unit to configure a communications link to a backhaul hub.

According to a third aspect there is presented a computer program for configuring a communications link, the computer program comprising computer program code which, when run on a network node functional unit, causes the network node functional unit to perform a method according to the first aspect.

According to a fourth aspect there is presented a computer program product comprising a computer program according to the third aspect and a computer readable means on which the computer program is stored.

According to a fifth aspect there is presented a method for configuring a communications link. The method is performed by a backhaul client functional unit. The method comprises receiving a notification from a network node functional unit to configure a communications link to a backhaul hub, wherein the notification was issued in response to control signalling wirelessly received by the network node functional unit from a user equipment, the control signalling relating to an uplink communications resource between the user equipment and the network node functional unit, the notification having been issued prior to the network node functional unit receiving any user data associated with said control signalling from said user equipment on said uplink communications resource. The method comprises initiating configuration of said communications link to the backhaul hub.

According to a sixth aspect there is presented a network node for configuring a communications link. The network node comprises a backhaul client functional unit. The backhaul client functional unit is arranged to receive a notification from a network node functional unit to configure a communications link to a backhaul hub. The notification was issued in response to control signalling wirelessly received by the network node functional unit from a user equipment. The control signalling relates to an uplink communications resource between the user equipment and the network node functional unit. The notification has been issued prior to the network node functional unit receiving any user data associated with the control signalling from the user equipment on the uplink communications resource. The backhaul client functional unit is arranged to initiate configuration of the communications link to the backhaul hub.

According to a seventh aspect there is presented a computer program for configuring a communications link, the computer program comprising computer program code which, when run on a backhaul client functional unit, causes the backhaul client functional unit to perform a method according to the fifth aspect.

According to a eighth aspect there is presented a computer program product comprising a computer program according to the seventh aspect and a computer readable means on which the computer program is stored.

It is to be noted that any feature of the first, second, third, fourth, fifth, sixth, seventh and eighth aspects may be applied to any other aspect, wherever appropriate. Likewise, any advantage of the first aspect may equally apply to the second, third, fourth, fifth, sixth, seventh and/or eighth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
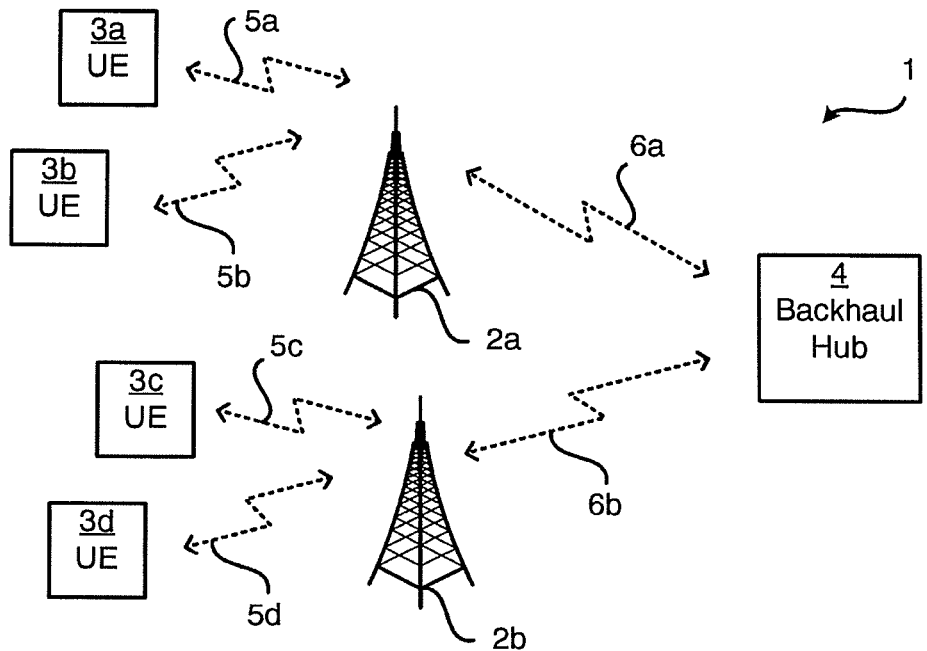
FIG. 1 is a schematic diagram illustrating a mobile communication network where embodiments presented herein may be applied.

There exist several standardized radio access networks that offer wireless data communication. Common for most of all these radio access networks is that initial control signalling precedes the actual data transfer. In general terms, the initial control signalling indicates that there soon will be data transferred from the entity transmitting of the initial control signalling to the entity receiving the initial control signalling. FIG. 1 is a schematic diagram illustrating a mobile communication network 1 where embodiments presented herein can be applied. The mobile communications network 1 comprises network nodes 2a, 2b, user equipment (UE) 3a, 3b, 3c, 3d and a backhaul hub 4. The term UE is also known as mobile communication terminal, mobile terminal, user terminal, user agent, mobile phone, etc. The term network node is also known as base station and may generally be a eNodeBs (E-UTRAN NodeB, also known as Evolved NodeB), a NodeB, a base transceiver station, or any type of similar base station. The network nodes 2a-b provide network connectivity to the UEs 3a-3d through wireless communications links 5a, 5b, 5c, 5d. In turn, the network nodes 2a-b are operatively connected to the backhaul hub 4 through wireless communications links 6a, 6b. The mobile communication network 1 may generally comply with any one or a combination of W-CDMA (Wideband Code Division Multiplex), LTE (Long Term Evolution), EDGE (Enhanced Data Rates for GSM Evolution, Enhanced GPRS (General Packet Radio Service)), CDMA2000 (Code Division Multiple Access 2000), etc., as long as the principles described hereinafter are applicable.

Figure 2:
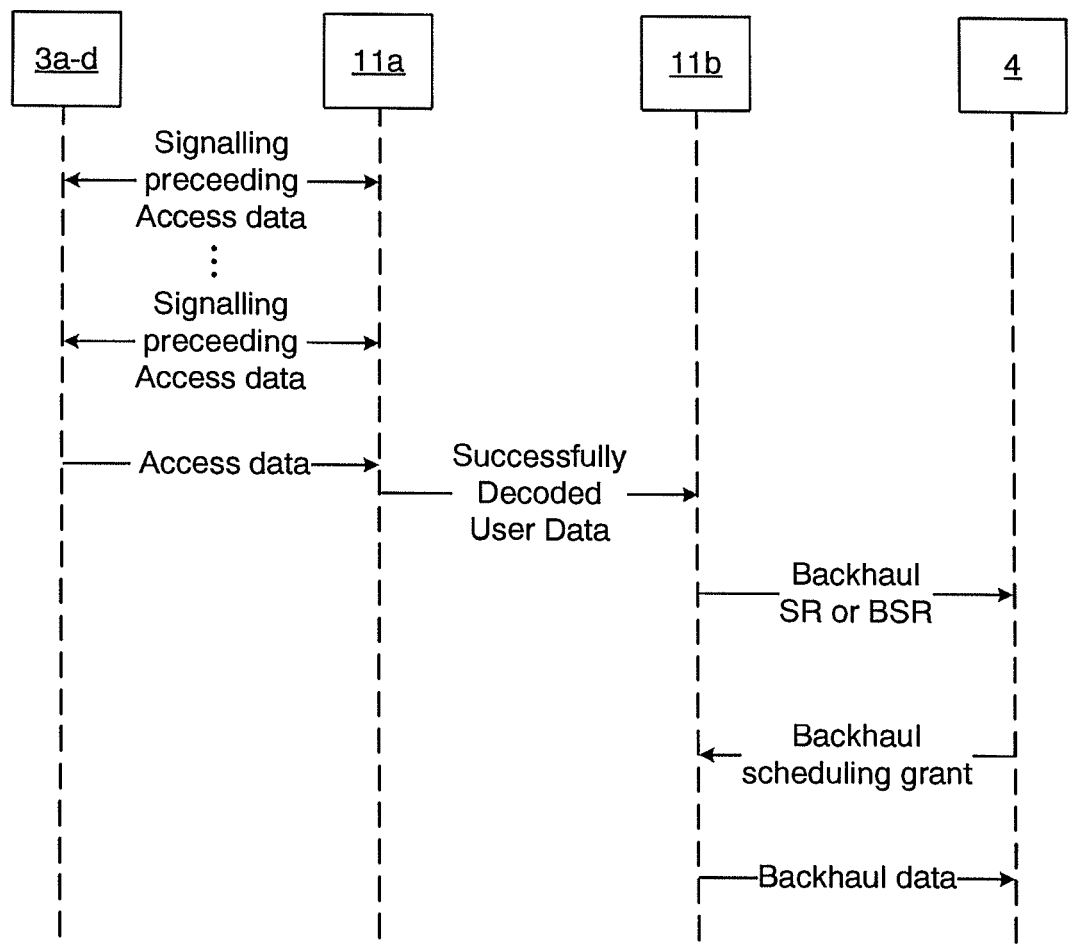
FIGS. 2-9 are signal flow diagrams according to embodiments.

As will be further disclosed below, each network node 2a-b may comprise a network node functional unit and a backhaul client functional unit. The network node functional unit is responsible for handling the communications with the UE 3a-d and the backhaul client functional unit is responsible for handling the communications with the backhaul hub. FIG. 2 illustrates an exemplary scenario where the communications between the UE 3a-d and the network node 2a-b as well as the communications between the network node 2a-b and the backhaul hub 4 is based on any wireless technology. In the exemplary scenario of FIG. 2 the communications between the network node 2a-b and the backhaul hub 4 is based on LTE. Examples of signalling that precede the actual data transfer in a LTE system are 'Scheduling Request' (SR), 'Buffer Status Report' (BSR), 'Scheduling Grant' (SG), and 'Access Grant' (AG). As schematically illustrated in FIG. 2, before access data (hereinafter denoted user data) is transmitted from the UE 3a-d to the network node functional unit 11a the UE 3a-d and the network node functional unit 11a exchange signalling preceding the user data. Such signalling is hereinafter denoted control signalling. After successfully decoded user data has been transmitted from the network node functional unit 11a to the backhaul client functional unit 11b the backhaul client functional unit 11b exchanges control signalling with the backhaul hub 4. According to the exemplary scenario of FIG. 2 the control signalling involves SR, BSR and SG. Backhaul data may then be transmitted from the backhaul client functional unit 11b to the backhaul hub 4. In general terms, the trigger for the backhaul capacity is provided by a uplink (UL) grant sent from the network functional unit 11a to the UE 3a-d.

Figure 3:
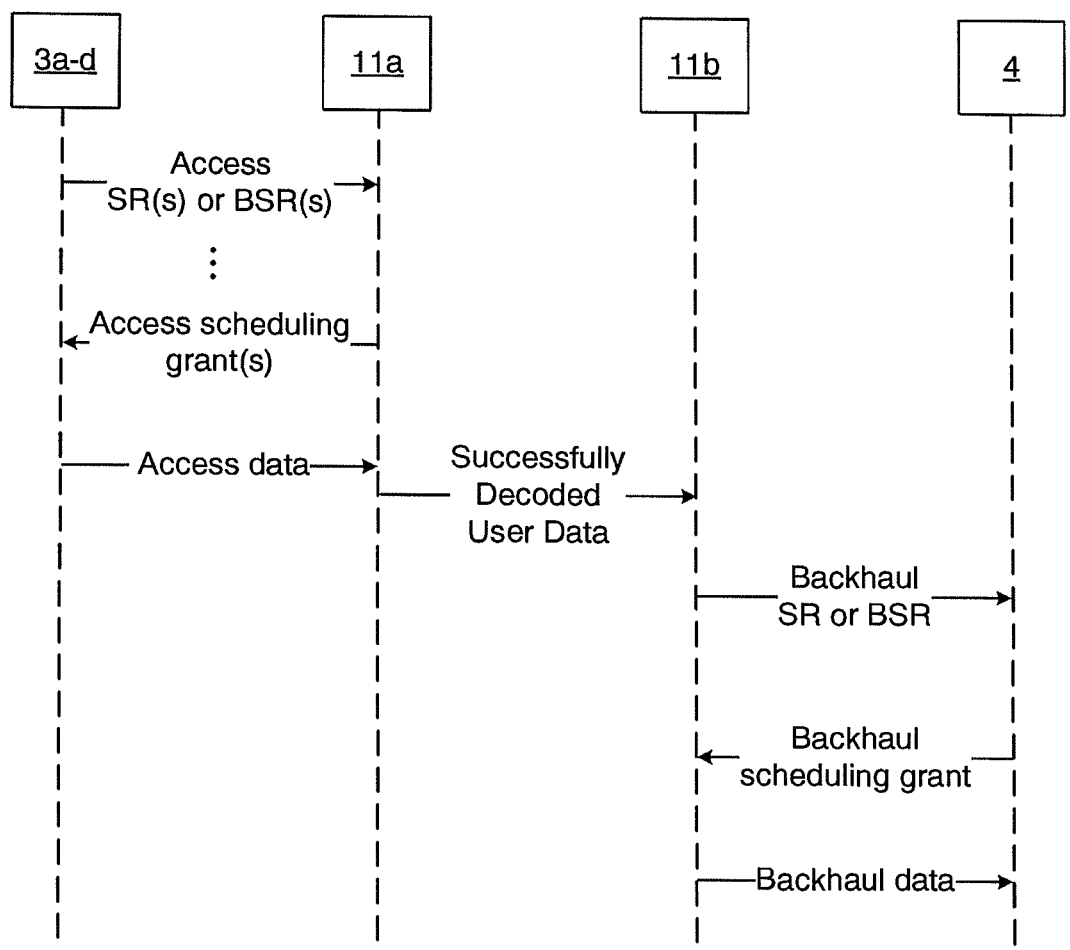

Scheduling in a conventional, data driven, wireless backhaul system is illustrated in FIG. 3. Successfully decoded data on the communications link between the UE 3a-d and the network node functional unit 11a is provided to a buffer at the backhaul client functional unit 11b after control signalling between the network node functional unit 11a and the UE 3a-d and transmission of user data from the network node functional unit 11a to the UE 3a-d. The transition from an empty to a non-empty buffer triggers the backhaul client functional unit 11b to request backhaul resources from the backhaul hub 4, as described above with reference to FIG. 2. The backhaul hub 4 grants resources and backhaul data is transmitted from the backhaul client functional unit 11b to the backhaul hub 4.

Figure 4:
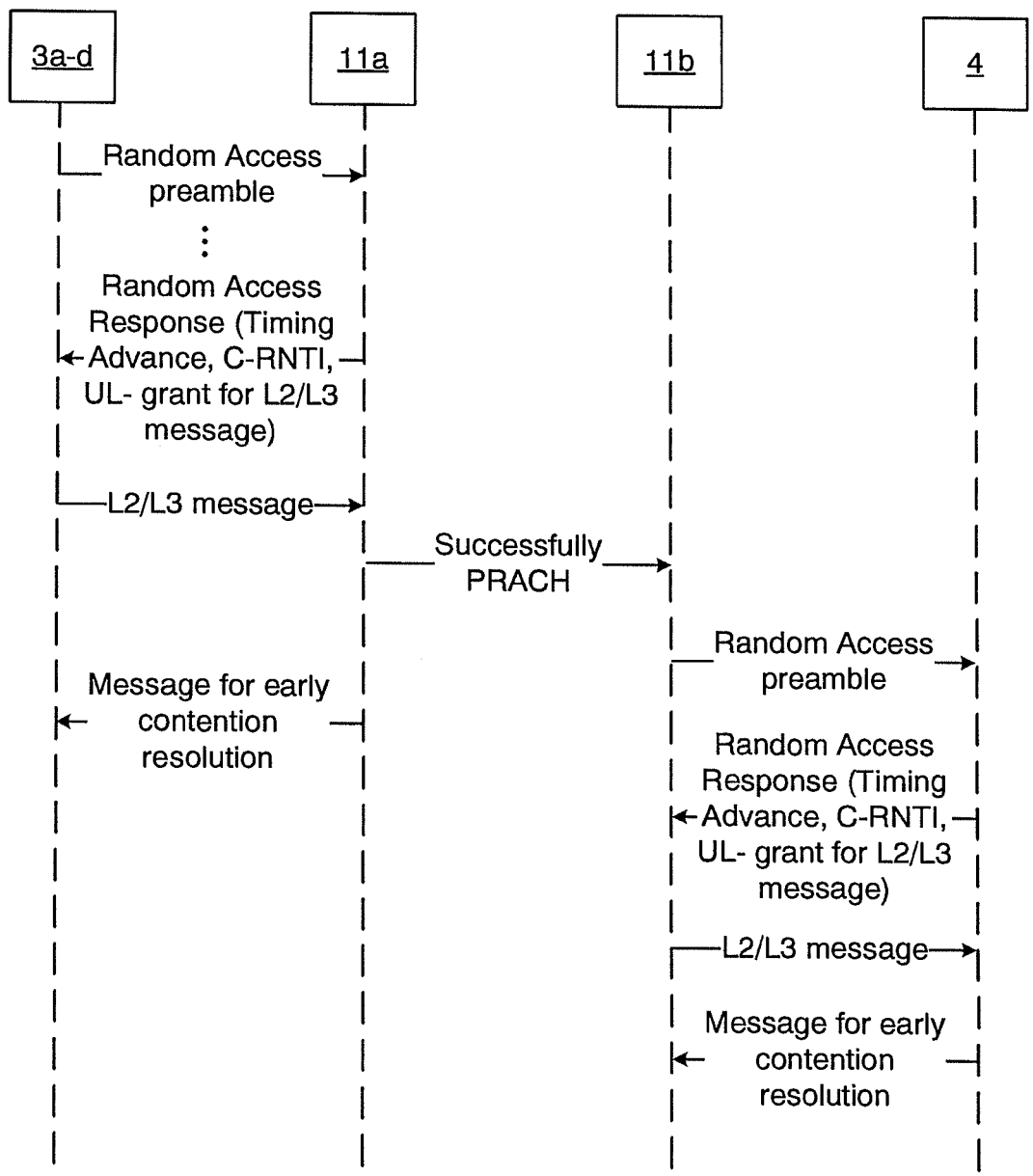

FIG. 4 illustrates the same system as described with reference to FIG. 3 but illustrates the control signalling if initial data shall be forwarded (i.e., so-called initial access). This may represent a scenario where data buffers in the UE 3a-d and in the backhaul client functional unit 11b were both empty when the data transfer need occurred in the UE 3a-d. The backhaul client functional unit 11b shall in such a case be prepared to forward data to the backhaul hub 4. This corresponds to scenarios where the backhaul switch from "Idle mode" to "Connected mode", described in FIG. 7.1-1 in the 3GPP specification 25.331 v 11.4.0. In general terms, initial access is the first action in order to switch from "Initial mode" to "Connected mode" in order to prepare the backhaul for data forwarding. A physical random access channel (PRACH) is provided for the UE 3a-d to request access to the network by means of establishing a communications link to a network node 2a-b). This means that random access bursts should be detected with good confidence and, when detected, used for propagation delay estimation. FIG. 4 shows the PRACH signalling scheme between a UE 3a-d and a network node functional unit 11a of a network node 2a-b. The signalling starts with the UE 3a-d transmitting a preamble within a predefined time window. Such a preamble is also part of the herein denoted control signalling. The network node functional unit thus needs to detect the incoming PRACH preamble and in return transmit a Random Access Response (RAR) containing an identifier of the used preamble within a given timeframe. The identifier includes the detected preamble and the time-frequency slot in which the preamble was detected. This RAR also contains timing alignment (TA) instructions, an initial uplink resource grant and an assignment of a Cell Radio Network Temporary Identifier (C-RNTI). In turn, the UE 3a-d responds to the network node functional unit with a so-called "Step 3 message".

The sequence of events in FIGS. 2 and 3 implies a relatively long data delay as the backhaul client functional unit 11b is enabled to initiate any signalling first when having observed that data has arrived at its buffers. Also, the PRACH sequence in FIG. 4 implies a long delay from UE initiated PRACH until the backhaul is ready for data transmissions.

The embodiments disclosed herein relate to configuring a communications link 6a, 6b. The embodiments disclosed herein are based on the network node functional unit 11a and the backhaul client functional unit 11b have access to and make use of information that data soon will be forwarded from a UE 3a-d to a network node 2a-b. Such information may be used to speed up the data forwarding over the backhaul link 6a-b. Also, as the backhaul link 6a-b does not need to be 3GPP compliant, proprietary modifications can be made to improve backhaul performance further (in comparison to LTE compliant backhaul access). Moreover, in order to speed up transition from "Idle mode" to "Connected mode" for the backhaul, some embodiments disclosed herein are based on a speculative "radio resource control (RRC) connect request" to be forwarded from the backhaul client functional unit 11b to the backhaul hub based on random access transmission from the UE 3a-d to the network node functional unit 11a.

In order to obtain configuration of a communications link 6a, 6b there is provided a network node 2a-b comprising a network node functional unit 11a, a method performed by the network node functional unit, a computer program 13a comprising code, for example in the form of a computer program product 12a, that when run on the network node functional unit 11a, causes the network node functional unit 11a to perform the method. In order to obtain configuration of a communications link 6a, 6b there is further provided a network node 2a-b comprising a backhaul client functional unit 11b, a method performed by the backhaul client functional unit 11b, a computer program 13b comprising code, for example in the form of a computer program product 12b, that when run on the backhaul client functional unit 11b, causes the backhaul client functional unit 11b to perform the method.

Figure 10:
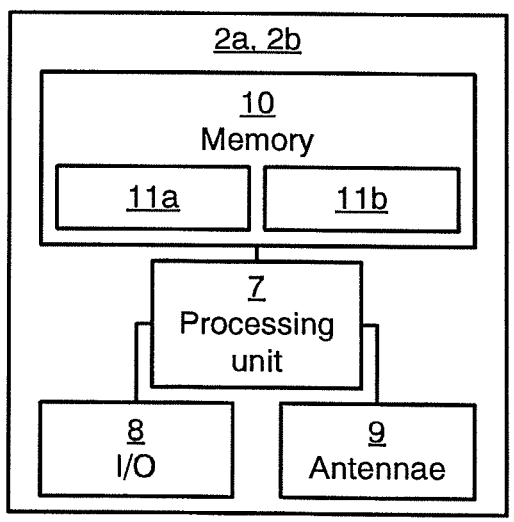
FIG. 10 is a schematic diagram showing functional units of a network node.

FIG. 10 schematically illustrates, in terms of a number of functional modules, the components of a network node 2a, 2b. A processing unit 7 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in at least one computer program product 12a, 12b (as in FIG. 11), e.g. in the form of a memory 10.

The memory 10 comprises instructions related to a network node functional unit 11a and to a backhaul client functional unit 11b. The network node functional unit 11a is thus arranged to hold functionality associated with the network node functional unit 11a. The backhaul client functional unit 11b is thus arranged to hold functionality associated with the backhaul client functional unit 11b. The memory 10 may also comprise persistent storage, which, for example, can be any single one or combination of magnetic memory, optical memory, solid state memory or even remotely mounted memory.

By accessing the memory 10 and/or the computer program product 12a, 12b the processing unit 7 is thereby arranged to execute methods as herein disclosed. The network node 2a, 2b may further comprise an input/output (I/O) interface 8 for receiving and providing information to other network nodes 2a, 2b The network node 2a, 2b may also comprises one or more transmitters and receivers as schematically denoted by the antennae 9, comprising analogue and digital components and a suitable number of antennae elements for radio communication with the UE 3a-d as well as the backhaul hub 4. The processing unit 7 controls the general operation of the network node 2a, 2b, e.g., by executing instructions as provided by the network node functional unit 11a and the backhaul client functional unit 11b. Other components, as well as the related functionality, of the network node 2a, 2b are omitted in order not to obscure the concepts presented herein.

Figure 11:
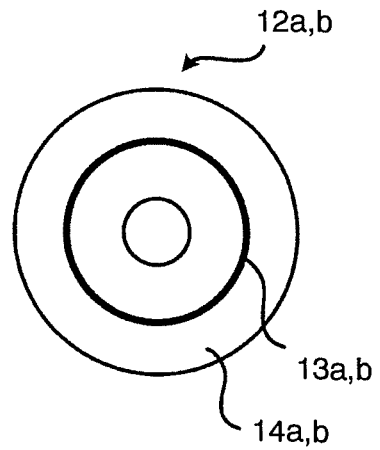
FIG. 11 shows one example of a computer program product comprising computer readable means.
Figure 12:
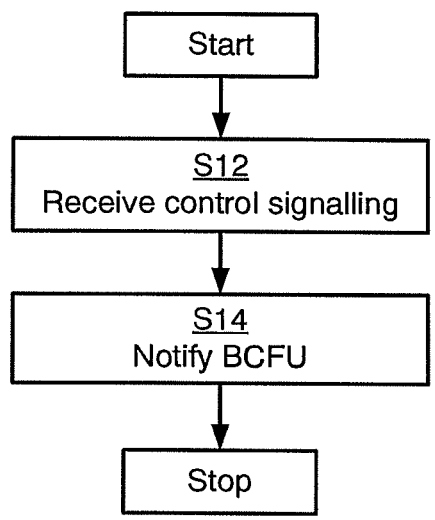
FIGS. 12, 13, 14 and 15 are flowcharts of methods according to embodiments.
Figure 14:
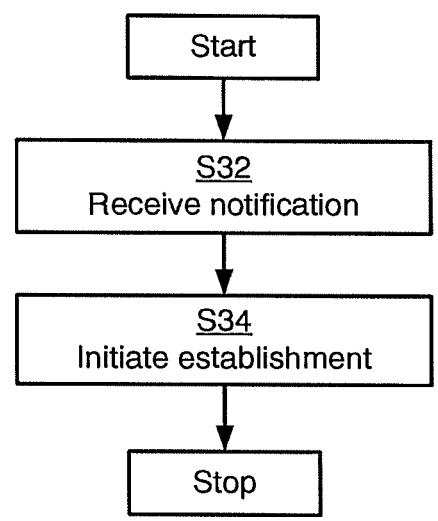
Figure 13:
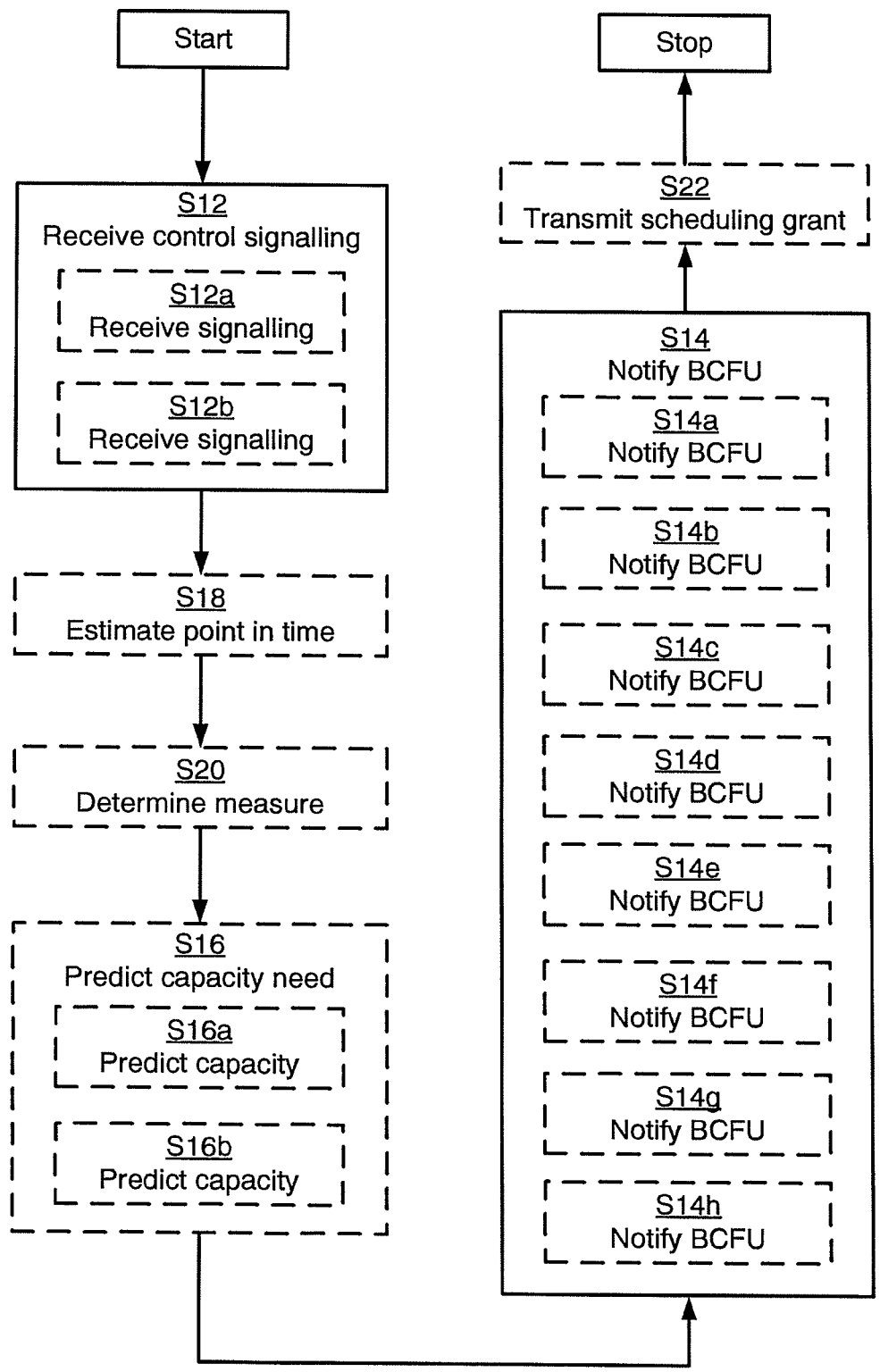
Figure 15:
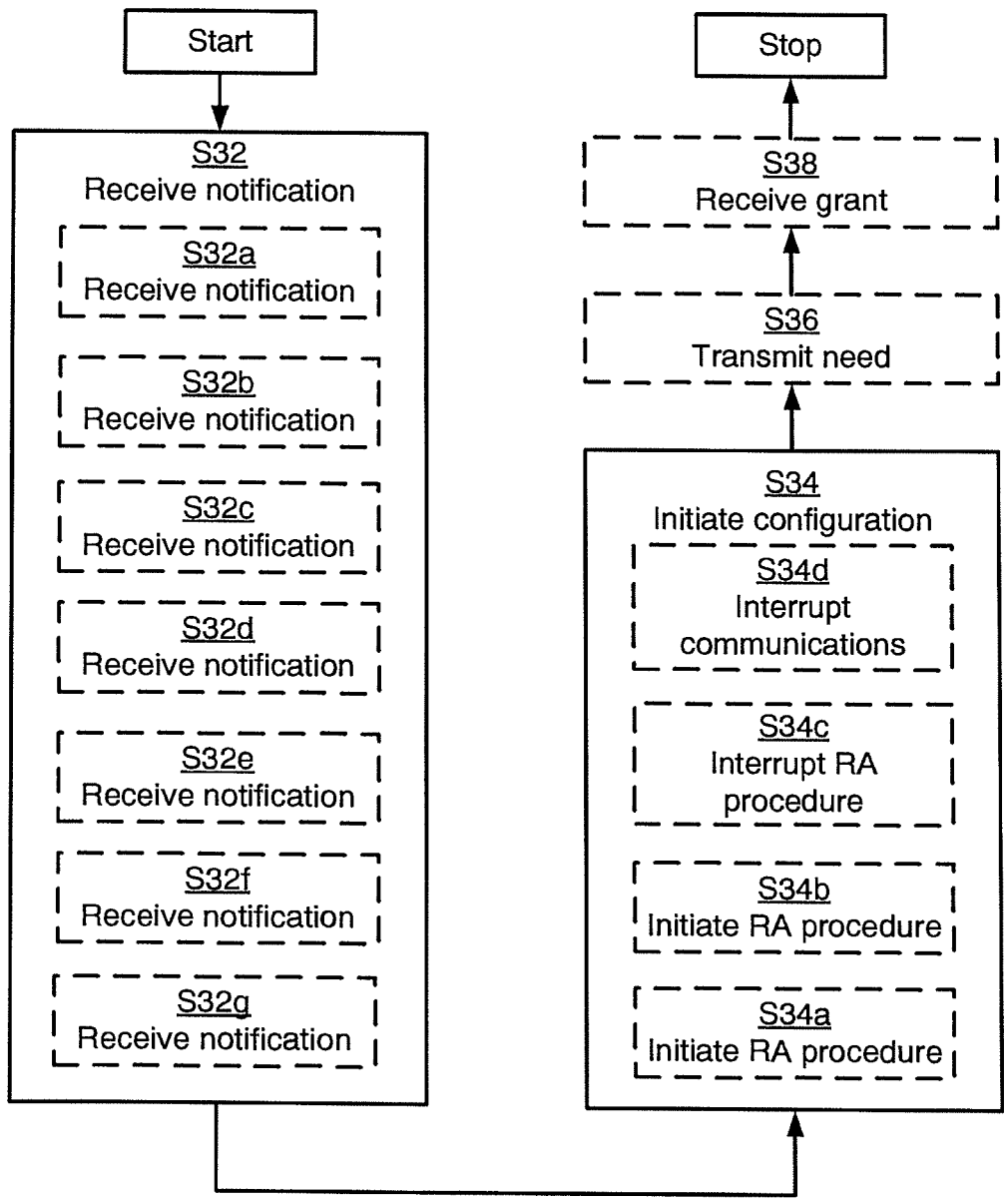

FIGS. 12, 13, 14 and 15 are flow charts illustrating embodiments of methods for configuring a communications link 6a, 6b. The methods of FIGS. 12 and 13 are performed by the network node functional unit 11a. The methods of FIGS. 12 and 13 are performed by the backhaul client functional unit 11b. The methods are advantageously provided as computer programs 13a, 13b. FIG. 11 shows one example of a computer program product 12a, 12b comprising computer readable means 14a, 14b. On this computer readable means 14a, 14b, at least one computer program 13a, 13b can be stored, which at least one computer program 13a, 13b can cause the processing unit 7 and thereto operatively coupled entities and devices to execute methods according to embodiments described herein. In the example of FIG. 11, the computer program product 12a, 12b is illustrated as an optical disc, such as a CD (compact disc) or a DVD (digital versatile disc) or a Blu-Ray disc. The computer program product 12a, 12b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the computer programs 13a, 13b are here schematically shown as a track on the depicted optical disk, the computer programs 13a, 13b can be stored in any way which is suitable for the computer program product 12a, 12b.

In general terms, the scheduler in a network node 2a, 2b is arranged to schedule resources in both downlink (i.e., transmission from a network node 2a, 2b to a UE 3a-d) and uplink (i.e., transmission from a UE 3a-d to a network node 2a, 2b). In the uplink, the scheduler needs information about the user data that is available in the buffers of the UE 3a-d. This is achieved by transmitting scheduling information messages from the UE 3a-d to the network node 2a, 2b to which the UE 3a-d is operatively connected. The scheduling information is transmitted as part of the Medium Access Layer Protocol (MAC) and can therefore be either piggy-backed with other transmissions (when those are on-going) or be sent stand alone by creating MAC protocol data units (PDUs) just to transfer the scheduling information.

According to the herein disclosed subject matter the scheduler is part of the network node functional unit 11a. The scheduler at the network node 2a, 2b is able to, with relatively high accuracy, predict the amount of data that will be added to the backhaul client functional unit 11b based on the signalling preceding the actual data transfer. This predicted information can be forwarded to the backhaul client functional unit 11b with low delay and the backhaul client functional unit 11b can perform reservation of backhaul capacity in a speculative way, leading to reduced delay for backhaul transmission.

Returning now to FIG. 1, the herein disclosed embodiments are in general terms based on the network node functional unit 11a evaluating (and predicting) a backhaul capacity need for a UE 3a-d based on signalling preceding actual data transfer from the UE 3a-d to the network node functional unit 11a. A method for configuring a communications link 6a, 6b as performed by a network node functional unit 11a thus comprises, in a step S12, wirelessly receiving control signalling from a user equipment, UE, 3a, 3b, 3c, 3d. The control signalling relates to an uplink communications resource between the UE 3a-d and the network node functional unit 11a.

The control signalling may be received over a physical uplink shared channel, PUSCH, or a physical uplink control channel, PUCCH. The communications resource may thus refer to a communications link 5a-d already having been established between the UE 3a-d and the network node functional unit 11a. Alternatively, and as will be further disclosed below, the control signalling may relate to initial access of the UE 3a-d to the network node functional unit 11a. According to one embodiment the communications resource may thus refer to a communications link 5a, 5b, 5c, 5d to be established between the UE 3a-d and the network node functional unit 11a. The control signalling may thus comprise a random access preamble or a response to the random access preamble. The control signalling may thus be received over a physical random access channel, PRACH.

The backhaul capacity need estimate is then sent to the backhaul client functional unit 11b. Particularly, the network node functional unit 11a is arranged to, in a step S14, notify the backhaul client functional unit 11b to configure a communications link 6a, 6b to a backhaul hub 4. In this respect, the communications link 6a, 6b to be configured may be an already established communications link 6a, 6b or a communications link 6a, 6b which is to be established (below referred to as initial access). Further, the configuration pertains to a change of at least one property of the communications link 6a, 6b. The change may involve change of amount of data to be transmitted, bit rate, scheduling, etc. The notifying is by the network node functional unit 11a performed in response to receiving the control signalling. The notifying is further performed prior to the network node functional unit 11a receiving any user data associated with the control signalling from the UE 3a-d on the uplink communications resource.

The notifying is received by the backhaul client functional unit 11b. A method for configuring a communications link 6a, 6b as performed by a backhaul client functional unit 11b thus comprises receiving, in a step S32, the notification from the network node functional unit 11a to configure the communications link 6a, 6b to the backhaul hub 4. The backhaul client functional unit 11b is then arranged to, in a step S34, initiate configuration of the communications link 6a-b to the backhaul hub 4. The backhaul hub 4 is thus arranged to receive signalling associated with the configuration from the backhaul client functional unit 11b.

As will be further disclosed next, a backhaul capacity grant issued by the backhaul hub 4 may be based on actual and/or predicted capacity need from all backhaul client functional units 11b operatively connected to the backhaul hub 4. Particularly, the network node functional unit 11a may be arranged to, in a step S16, predict a backhaul capacity need for transmitting user data from the backhaul client functional unit 11b to the backhaul hub 4. The prediction is based on the control signalling received by the network node functional unit 11a. The prediction may be based on at least one from a set of available parameters suitable for evaluation and prediction of the need of backhaul resources. In general terms the herein disclosed available parameters suitable for evaluation and prediction of the need of backhaul resources are indicative of a resource need.

For example, if present, the backhaul capacity need may be predicted based on a random access preamble in the control signalling. The random access preamble may imply that UL backhaul resources may be needed within a short period. For example, if present, the backhaul capacity need may be predicted based on a random access response in the control signalling. The random access response may imply, with an even larger probability than if a random access preamble is present, that UL backhaul resources may be needed resources within a short period.

For example, if present, the backhaul capacity need may be predicted based on a scheduling request (SR) in the control signalling. The SR may imply with a large probability that UL backhaul resources may be needed within a short period. For example, if present, the backhaul capacity need may be predicted based on an access grant (AG) in the control signalling, the AG following a SR. The AG may imply, with an even larger probability than if a SR is present, that UL backhaul resources may be needed within a short period.

For example, if present, the backhaul capacity need may be predicted based on a buffer status report (BSR) in the control signalling. The BSR may imply that there will be a specific need of UL backhaul resources within a short period. For example, if present, the backhaul capacity need may be predicted based on information in the control signalling regarding the amount of data in at least one uplink buffer originating from the UE 3a-d. This may indicate that there exists an immediate need of UL backhaul resources corresponding to the amount of data in the buffer. For example, if present, the backhaul capacity need may be predicted based on an AG in the control signalling, the AG following a BSR. The AG may imply, with an even larger probability than if a BSR is present, that UL backhaul resources may be needed within a short period. For example, if present, the backhaul capacity need may be predicted based on channel state information (CSI) in the control signalling. The network node functional unit 11a may be arranged to estimate of how the backhaul resource need indicated by BSR will change over time by means of the CSI.

The prediction may further be based on an amount of data generated by the network node functional unit 11a addressed to a network-side node, such as ho to another network node 2b or a backhaul hub 4. This prediction may correspond to the actual amount of data generated.

The notification with backhaul capacity need as sent in step S14 from the network node functional unit 11a to the backhaul client functional unit 11b may comprise a predicted estimate of backhaul need for the time when a grant is expected from the backhaul hub 4. The network node functional unit 11a may therefore be arranged to, in a step S18, estimate a point in time for a scheduling grant to be issued by the backhaul hub 11b. The scheduling grant pertains to the backhaul capacity need. The backhaul capacity need may be predicted based on said point in time.

The notification with backhaul capacity need as sent in step S14 from the network node functional unit 11a to the backhaul client functional unit 11b may alternatively be provided as a forecast of future backhaul need over close time. That is, the backhaul capacity need may be predicted for data transmission from the backhaul client functional unit 11b to the backhaul hub 4 over a predetermined period of time.

Information relating to the prediction may then be forwarded from the network node functional unit 11a to the backhaul client functional unit 11b and from the backhaul client functional unit 11b to the backhaul hub 4. Particularly, the network node functional unit 11a may be arranged to, in a step S14f, notify, in response to receiving the control signalling and prior to receiving any user data corresponding to the control signalling from the UE 3a-d on the uplink communications resource, the backhaul client functional unit 11b of the predicted backhaul capacity need. The network node functional unit 11a may further be arranged to, in a step S22, transmit a scheduling grant to the UE 3a-d in conjunction with notifying the backhaul hub functional 11a of the predicted backhaul capacity need. This may further reduce the time needed before any backhaul transmission may be executed.

The prediction information sent by the network node functional unit 11a is received by the backhaul client functional unit 11b. Particularly, the backhaul client functional unit 11b may be arranged to, in a step S32f, receive the notification from the network node functional unit 11a. The backhaul client functional unit 11b may then be arranged to, in a step S36, wirelessly transmit the predicted backhaul capacity need to the backhaul hub 4. The predicted backhaul capacity need is then received by the backhaul hub 4.

Figure 5:
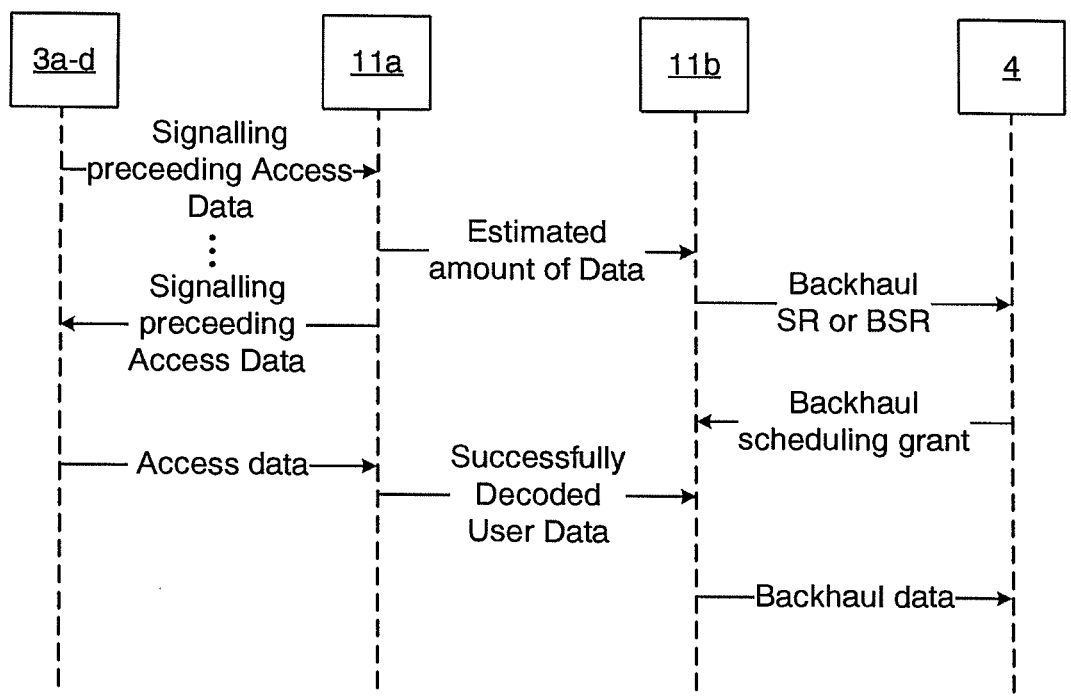

An advantage with providing a notification comprising a predicted estimate is that the backhaul hub 4 does not need to be involved in the prediction process. Hence, the backhaul hub 4 may in such scenarios act as a common network node 2a-b, such as an LTE eNodeB. In this context, the backhaul client functional unit 11b may act as a UE 3a-d, such as an LTE UE (except for handling prediction and estimation as herein disclosed). This is illustrated in FIG. 5. In FIG. 5 the network node functional unit 11a transmits a prediction to the backhaul client functional unit 11b before having received any user data from the UE 3a-d. As further illustrated in FIG. 5, the backhaul client functional unit 11b may thereby initiate communications with the backhaul hub 4 before having received any user data from the network node functional unit 11a.

Figure 6:
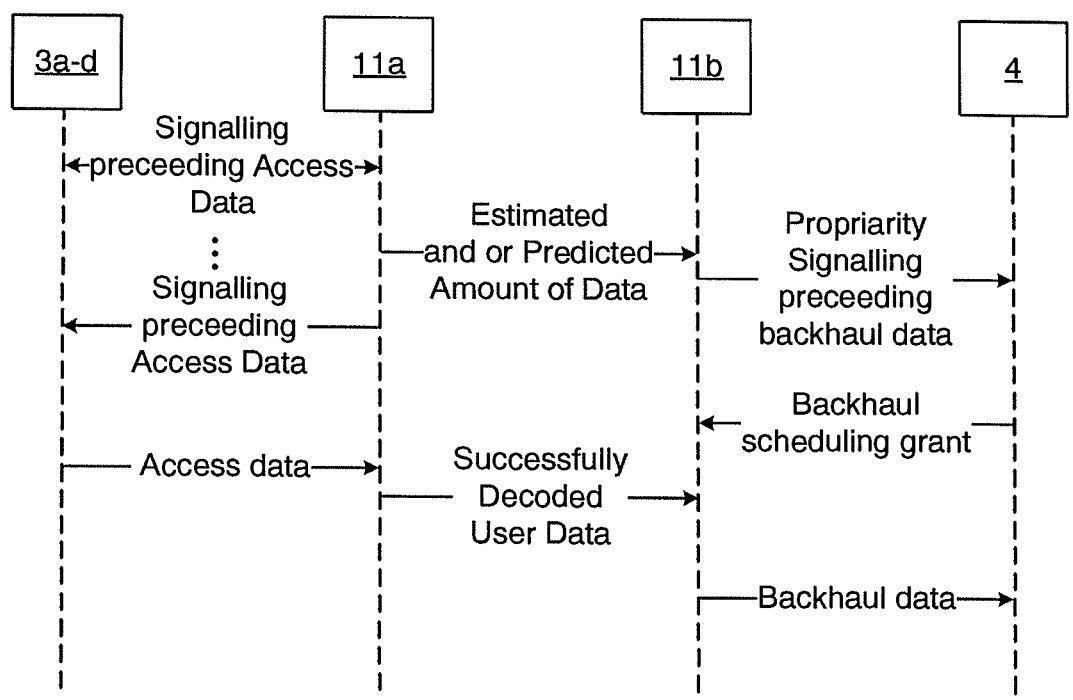

Alternatively, if the backhaul hub 4 receives a forecast of future backhaul need over close time from each operatively connected backhaul client functional unit 11b, the backhaul hub 4 may be enabled to determine scheduling decisions which take into consideration information from more than one client functional unit 11b. Moreover, the backhaul hub 4 may further be arranged to issue speculative grants with good result even if a new updated BSR is received late. This is illustrated in FIG. 6.

A further alternative is that each backhaul client functional unit 11b sends a forecast of a future backhaul need and a corresponding reliability measure of this forecast to the backhaul hub 4. Therefore, the network node functional unit 11a may be arranged to, in a step S20, determine a reliability measure of the prediction. The network node functional unit 11a may then be arranged to, in a step S14g, notify the backhaul client functional unit 11b of the determined reliability measure in conjunction with the notification of the predicted backhaul capacity need. Thereby, for a backhaul client functional unit 11b that will receive user data with a probability less than 1 may only receive a speculative grant if no other backhaul client functional units 11b will receive user data with probability 1. This alternative is also covered by the steps illustrated in FIG. 6.

Figure 7:
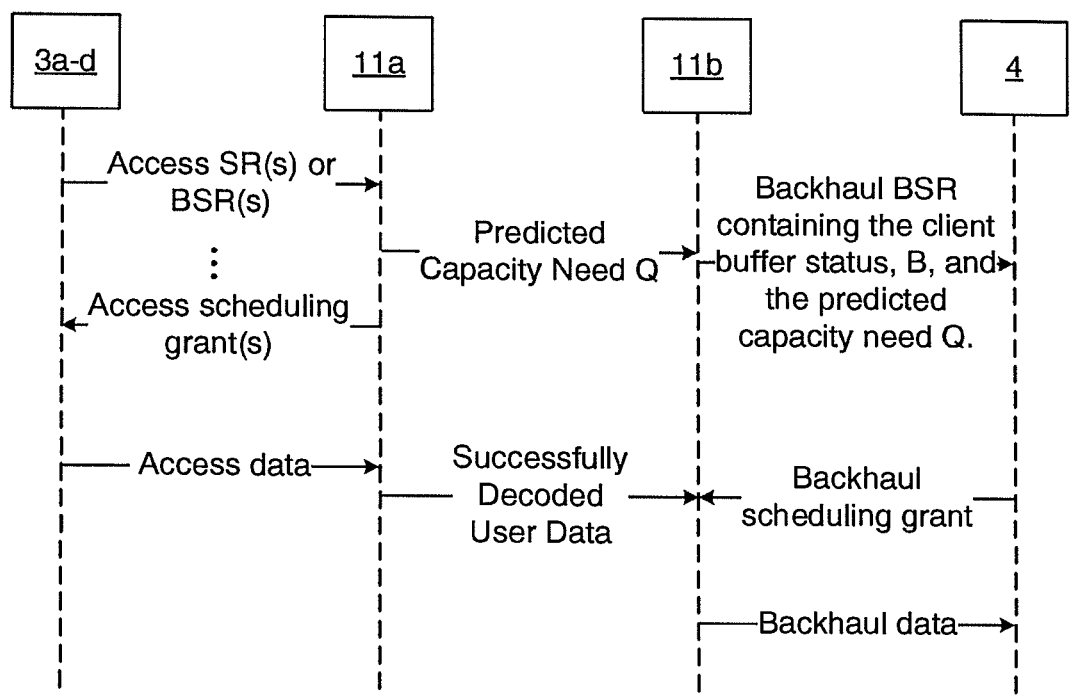
Figure 8:
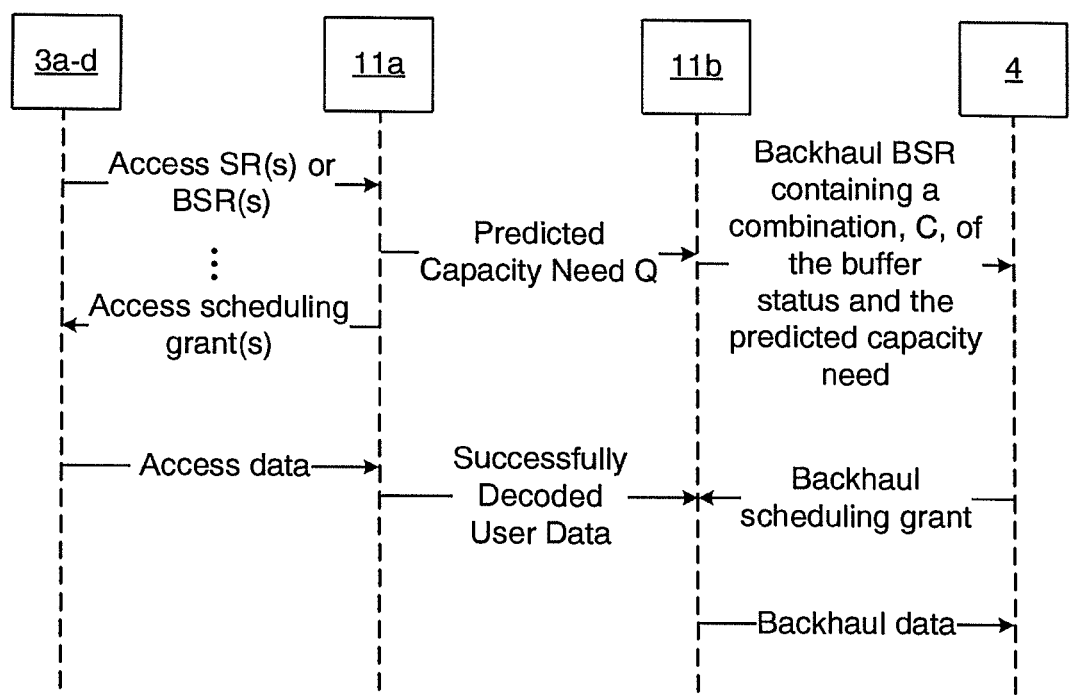

The LTE standard supports data streams with different priorities in such way that the UE 3a-d is arranged to inform the network node functional unit 11a of the buffer status for each priority class. Hence, the user data to be transmitted may be associated with at least two priority classes, and the control signalling from the UE 3a-d may comprise buffer status information from at least one of the at least two priority classes. A format which considers priority classes may thus be utilized for the LTE oriented wireless backhaul, thereby enabling the backhaul hub 4 scheduler to perform decisions based on data priority. This is illustrated in FIG. 7. An alternative approach is illustrated in FIG. 8. As noted above, the predicted backhaul capacity need may be based on parameters received by the network node functional unit 11a in the control signalling from the UE 3a-d. Additionally or alternatively the network node functional unit 11a may me arranged to determine the predicted backhaul capacity need based on other parameters, such as uplink communications resource between the UEs 3a-d and the network node functional unit 11a. Particularly, the network node functional unit 11a may be arranged to, in a step S12a, wirelessly receive separate control signalling from $K_1$ number of UEs 3a-d, wherein each separate control signalling relates to an uplink communications resource between one UE 3a-d and the network node functional unit 11a. The network node functional unit 11a may then be arranged to, in a step S16a, predict the backhaul capacity need, Q, as $$Q=\Sigma_k(G_k(1-P_k))[\text{bytes}]$$

where $\Sigma_k$ is the summations operator over the index k, where $0<P_k<1$ denotes hybrid automatic repeat request, HARQ, retransmission rate on the k:th access link, $1<k<K$, and where $G_k$ denotes the access scheduling grant for the k:th access link, $1<k<K$. The network node functional unit 11a may be further be arranged to, in a step S12b, wirelessly receive separate control signalling from $K_2<K_1$ number of UEs 3a-d, wherein each separate control signalling relates to an uplink communications resource between one UE 3a-d and the network node functional unit 11a. Further, for $K_2$, the network node functional unit 11a may be arranged to, in a step S16b, predict the backhaul capacity need, Q, as $$Q=\Sigma_k(G_k)[\text{bytes}],$$

where $\Sigma_k$ is the summations operator over the index k, where $G_k$ denotes the access scheduling grant for the k:th access link, $1<k<K_2$. This alternative estimation of Q may be used in order to avoid assigning too small grants to transmit a complete OSI (Open Systems Interconnection) model layer-3 packet.

As the skilled person understands, these are just two examples of available ways to determine Q. For example, the backhaul capacity need, Q, may take into consideration also the magnitude of the $G_k$. For example, if all $G_k$ are ordered such that $G_i > G_{i+1}$ for all i=1, ..., K, then Q could be estimated as $G_1 + \Sigma_{k>1}(G_k(1-P_k))$[bytes].

The network node functional unit 11a may then be arranged to, in a step S14h, notify the backhaul client functional unit 11b to transmit Q and information regarding a current buffer status, B, of the backhaul client functional unit to the backhaul hub 4. B and Q may be transmitted either as separate values or as a single value, C, for example as C=B+Q.

Upon reception of this notification the backhaul client functional unit 11b may in turn me arranged to forward Q along with its current buffer status, B, as a backhaul BSR message to the backhaul hub 4. This enables the scheduler at the backhaul hub 4 to grant resources in advance (at most B+Q bytes) which in turn enables backhaul transmission to start immediately after user data is available in the buffer at the backhaul client functional unit 11b.

In general terms, the predicted backhaul capacity need may thus be based on control signaling from a plurality of UEs 3a-d. Particularly, the network node functional unit 11a may be arranged to, in a step S12c, wirelessly receive further control signalling from at least one further u UE 3a-d, the further control signalling relating to user data to be transmitted between the at least one further UE 3a-d and the network node functional unit 11a. The network node functional unit 11a may then be arranged to, in a step S16b, predict the backhaul capacity need also based on the further control signalling. One such example has been provided above with reference to the determined backhaul capacity need Q. The predicted backhaul capacity need based on the further control signalling is transmitted to, and received by, the backhaul client functional unit 11b.

The backhaul client functional unit 11b may further receive predicted backhaul capacity needs from a plurality of network node functional units 11a. Particularly the backhaul client functional unit 11b may be arranged to, in a step S32g, receive a further notification from a further network node functional unit 11a, the further notification comprising a further predicted backhaul capacity need, the further predicted backhaul capacity need being based on further control signalling received by the further network node functional unit 11a. The backhaul client functional unit 11b may then be arranged to determine the predicted backhaul capacity need to be wirelessly transmitted to the backhaul hub 4 also based on the further predicted backhaul capacity need.

Further, as inferred from the above, the backhaul hub 4 may receive actual and/or predicted capacity needs from a plurality of backhaul client functional units 11b. The backhaul capacity grant issued by the backhaul hub 4 may therefore be based on actual and/or predicted capacity needs as transmitted from all backhaul client functional units 11b. The backhaul client functional unit 11b may therefore be arranged to, in a step S38, wirelessly receive a backhaul capacity grant from the backhaul hub 4 where the backhaul capacity grant is based on actual and/or the predicted capacity need from all backhaul client functional units 11b operatively connected to the backhaul hub 4.

In the embodiment illustrated in FIG. 7 it may be assumed that a backhaul BSR is transmitted in every sub-frame (however, as will be understood from the below, this is not a necessary criterion). Clearly, this minimizes the queuing delay at the backhaul client functional unit 11b and the overhead is manageable as long as the number of backhaul client functional units 11b operatively connected to the backhaul hub 4 remains below a certain number of operatively connected devices. To maintain a low overhead also when there are a higher number of operatively connected devices, it may be necessary to reduce the BSR rate. In either case, Q may be regarded as a prediction of the number of bytes that will be added in the backhaul client functional unit 11b buffers until the next BSR. In addition to the B bytes that reside in the buffer at the backhaul client functional unit 11b when the backhaul BSR is transmitted, the backhaul hub 4 may be arranged to grant resources corresponding to an average data rate of Q/N bytes per sub-frame, where N is the number of sub frames between two backhaul BSRs. Further, assuming a wireless backhaul (i.e., wireless communications links 6a-b) that has similar performance characteristics as the LTE access network, an uplink scheduling grant sent in sub-frame n is valid in sub-frame n+4. As a consequence thereof, the delay reduction achieved is 4 ms.

To reduce the BSR overhead further, the backhaul client functional unit 11b may be arranged to combine the current buffer status and the predicted capacity need into a single value. The backhaul client functional unit 11b may further be arranged to report this value to the backhaul hub 4. This is illustrated in FIG. 8. In this and similar cases, the format for the BSR report can be used as it is specified in 3GPP/LTE. For example, the backhaul client functional unit 11b may report C=B+Q as the BSR.

As noted above, the control signalling may relate to initial access of the UE 3a-d to the network node functional unit 11a. As disclosed next, herein disclosed embodiments may in such scenarios enable the time to change from "Idle mode" to "Connected mode" to be reduced.

In general terms, if the backhaul is in "Idle mode" a random access preamble issued by a UE 3a-d may be regarded as an indicator to set the backhaul in "Connected mode". That the transmission of the random access preamble does not result in any further signalling does not matter since the UE 3a-d for some reason deems a connection to the network node functional unit 11a to be of useneed. For example, the UE 3a-d may at a later stage transmit a further random access preamble. The random access preamble may be regarded as the first step in the connection set-up between the UE 3a-d and the network node functional unit 11a.

Figure 9:
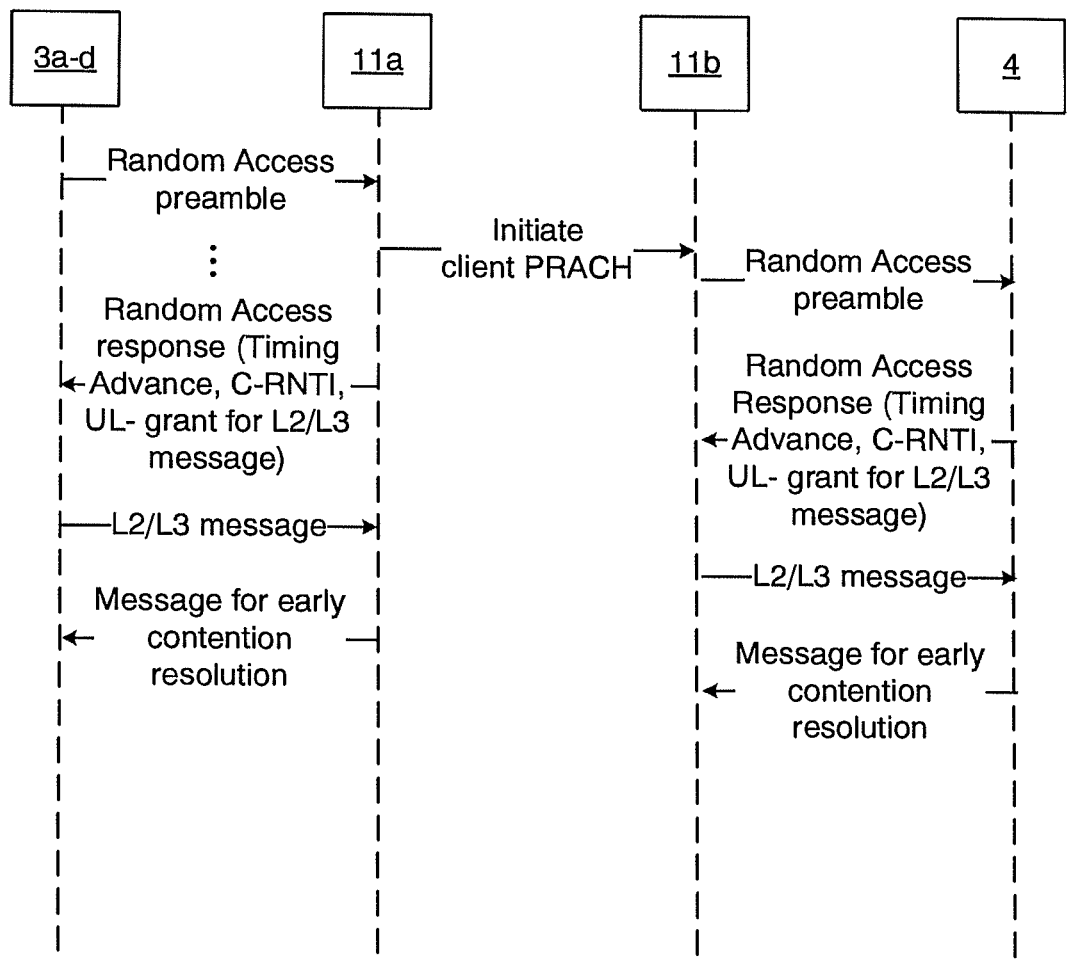

In this case the signalling flow according to FIG. 9 follows. As soon as a random access preamble is received by the network node functional unit 11a a random access procedure may also be initiated between the backhaul client functional unit 11b and the backhaul hub 4. Particularly, the network node functional unit 11a may be arranged to, in a step S14a, notify the backhaul client functional unit 11b to initiate a random access procedure with the backhaul hub 4 in response to the network node functional unit 11b having received the control signalling from the network node functional unit 11a in step S32. The backhaul client functional unit 11b may thus be arranged to, in a step S32a, receive the notification from the network node functional unit 11a to configure the communications link by initiating a random access procedure with the backhaul hub 4. The backhaul client functional unit 11b may then be arranged to, in a step S34a, initiate the random access procedure with the backhaul hub 4.

This procedure may be initiated by the backhaul client functional unit 11b sending a random access preamble in the first available time and frequency interval allocated for random access. Therefore, the network node functional unit 11*a* may be arranged to, in a step S14*b*, notify the backhaul client functional unit to 11*b* initiate the random access procedure by wirelessly transmitting a random access preamble in a first available time and frequency interval allocated for random access between the backhaul client functional unit 11*b* and the backhaul hub 4. This notification is received by the backhaul client functional unit to 11*b* in a step S32*b*. The backhaul client functional unit to 11*b* may then be arranged to, in a step S34*b*, initiate the random access procedure by wirelessly transmitting the random access preamble in the first available time and frequency interval allocated for random access between the backhaul client functional unit 11*b* and the backhaul hub 4.

The network node functional unit 11*a* may determine a false detection of a random access preamble. In this case no L2/L3 message associated with the falsely detected random access preamble will be detected from the UE 3*a*-*d* and the random access procedure may be terminated by the network node functional unit 11*a*. The initiated random access procedure between the backhaul client functional unit 11*b* and the backhaul hub 4 may however already have been initiated but is of no use. At least two alternative procedures can then be followed by the backhaul client functional unit 11*b*.

One possible procedure is that the L2/L3 message from the backhaul client functional unit 11*b* is not transmitted to the backhaul hub 4 such that the random access procedure between the backhaul client functional unit 11*b* and the backhaul hub 4 is terminated. The network node functional unit 11*a* may therefore be arranged to, in a step S14*c*, notify the backhaul client functional unit to interrupt the initiated random access procedure by the backhaul client functional unit 11*b* by not transmitting any L2 and/or L3 messages to the backhaul hub 4. This notification is received by the backhaul client functional unit 11*b* in a step S32*c*. The backhaul client functional unit to 11*b* may then be arranged to, in a step S34*c*, interrupt the initiated random access procedure according to the received notification. The backhaul hub 4 may thus be arranged to regard the random access preamble transmitted by the backhaul client functional unit to 11*b* as a false detection.

An alternatively procedure is that the random access procedure between the backhaul client functional unit 11*b* and the backhaul hub 4 is finalized, but that the backhaul client functional unit 11*b* does not request any transmission on the thus established backhaul (i.e. on the communications link 6*a*-*b*) or reports an empty BSR to the backhaul hub 4. That is, in an embodiment where the random access procedure has been completed, the network node functional unit 11*a* may be arranged to, in a step S14*d*, notify the backhaul client functional unit 11*b* to interrupt further communications with the backhaul hub 4 by not requesting any transmission on the communications link 6*a*-*b* to the backhaul hub 4 or by transmitting an empty buffer status report (BSR) to the backhaul hub 4. This notification is received by the backhaul client functional unit 11*b* in a step S32*d*. The backhaul client functional unit to 11*b* may then be arranged to, in a step S34*d*, interrupt the further communications according to the received notification.

A yet further alternatively procedure is that the backhaul client functional unit 11*b* and the backhaul hub 4 already have established a connection. The backhaul client functional unit 11*b* may then send a scheduling request (SR) or buffer status report (BSR) instead when the network node functional unit 11*a* detects a random access preamble. That is, in an embodiment where the backhaul client functional unit 11*b* has established the communication link 6*a*-*b* to the backhaul hub 4, the network node functional unit 11*a* may be arranged to, in a step S14*e*, notify, the backhaul client functional unit 11*b*, upon having received the control signalling from the UE 3*a*-*d*, to transmit a scheduling request, SR, or buffer status report, BSR, to the backhaul hub 4. This notification is received by the backhaul client functional unit 11*b* in a step S32*e*. The backhaul client functional unit to 11*b* may then be arranged to perform the instructions as received in the notification.

The inventive concept has mainly been described above with reference to a few embodiments. However, as is readily appreciated by a person skilled in the art, other embodiments than the ones disclosed above are equally possible within the scope of the inventive concept, as defined by the appended patent claims. For example, the backhaul does not need to be 3GPP compliant. Proprietary modifications may thus be made to improve backhaul performance further compared to a LTE compliant backhaul access. Such modifications may enable the backhaul hub 4 to be aware of not only an estimate of the current resource need, but also of the prediction (future backhaul capacity need). This may enable the backhaul hub 4 to perform more intelligent scheduling decisions, which in turn may lead to yet further increased quality of service.

The invention claimed is:

1. A method for configuring a communications link, the method being performed by a network node functional unit, comprising the steps of:
   wirelessly receiving control signalling from a user equipment, the control signalling relating to an uplink communications resource between the user equipment and the network node functional unit; and
   notifying in response to receiving said control signalling and prior to receiving any user data associated with said control signalling from said user equipment on said uplink communications resource, a backhaul client functional unit to configure the communications link to a backhaul hub, wherein configuring the communications link includes changing at least one property of the communications link.

2. The method according to claim 1, wherein the communications resource refers to a communications link to be established between the user equipment and the network node functional unit.

3. The method according to claim 1, wherein the control signalling comprises a random access preamble or a response to the random access preamble.

4. The method according to claim 1, further comprising:
   notifying the backhaul client functional unit to initiate a random access procedure with the backhaul hub in response to the network node functional unit receiving the control signalling.

5. The method according to claim 4, further comprising:
   notifying the backhaul client functional unit to interrupt the initiated random access procedure by the backhaul client functional unit by not transmitting any L2 and/or L3 messages to the backhaul hub.

6. The method according to claim 4, wherein, if the random access procedure has been completed, the method further comprises:
   notifying the backhaul client functional unit to interrupt further communications with the backhaul hub by not requesting any transmission on the communications link to the backhaul hub or by transmitting an empty buffer status report to the backhaul hub.

7. The method according to claim 1, wherein, if the backhaul client functional unit has established the communication link to the backhaul hub, the method further comprises:
notifying upon having received the control signalling, the backhaul client functional unit to transmit a scheduling request, SR, or buffer status report, BSR, to the backhaul hub.

8. The method according to claim 7, wherein the user data to be transmitted is associated with at least two priority classes, and wherein the control signalling from the user equipment comprises buffer status information from at least one of said at least two priority classes.

9. The method according to claim 1, further comprising:
predicting based on the received control signalling, a backhaul capacity need for transmitting user data from said backhaul client functional unit to said backhaul hub; and
notifying in response to receiving said control signalling and prior to receiving said user data corresponding to said control signalling from said user equipment on said uplink communications resource, the backhaul client functional unit of the predicted backhaul capacity need.

10. The method according to claim 9, further comprising:
determining a reliability measure of the prediction; and
notifying the backhaul client functional unit of the determined reliability measure to the backhaul client functional unit in conjunction with the predicted backhaul capacity need.

11. The method according to claim 9, further comprising:
transmitting a scheduling grant to the user equipment in conjunction with notifying the backhaul hub functional unit of the predicted backhaul capacity need.

12. The method according to claim 9, further comprising:
wirelessly receiving further control signalling from at least one further user equipment, the further control signalling relating to user data to be transmitted between the at least one further user equipment and the network node functional unit; and
predicting said backhaul capacity need also based on said further control signalling.

13. The method according to claim 9, wherein the predicted backhaul capacity need, Q, is predicted by the formula $Q=\Sigma_k(G_k(1-P_k))$[bytes], where $\Sigma_k$ is the summations operator over the index k, where $0<P_k<1$ denotes hybrid automatic repeat request, HARQ, retransmission rate on the k:th access link, $1<k<K$, and where $G_k$ denotes the access scheduling grant for the k:th access link, $1<k<K$.

14. The method according to claim 9, wherein the predicted backhaul capacity need, Q, is predicted by the formula $Q=G_1+\Sigma_{k>1}(G_k(1-P_k))$[bytes], where $\Sigma_k$ is the summations operator over the index k, where $0<P_k<1$ denotes hybrid automatic repeat request, HARQ, retransmission rate on the k:th access link, $1<k<K$, and where $G_k$ denotes the access scheduling grant for the k:th access link, $1<k<K$, and wherein $G_k$ is a decreasing sequence.

15. The method according to claim 1, wherein the at least one property of the communications link includes one of an amount of data to be transmitted, a bit rate, and a scheduling.

16. A method for configuring a communications link, the method being performed by a backhaul client functional unit, comprising the steps of:
receiving a notification from a network node functional unit to configure the communications link to a backhaul hub, wherein the notification was issued in response to control signalling wirelessly received by the network node functional unit from a user equipment, the control signalling relating to an uplink communications resource between the user equipment and the network node functional unit, the notification having been issued prior to the network node functional unit receiving any user data associated with said control signalling from said user equipment on said uplink communications resource; and
initiating configuration of said communications link to the backhaul hub, wherein configuring the communications link includes changing at least one property of the communications link.

17. The method according to claim 16, wherein the communications resource refers to a communications link to be established between the user equipment and the network node functional unit.

18. The method according to claim 16, further comprising:
receiving a notification from the network node functional unit to configure the communications link by initiating a random access procedure with the backhaul hub, the notification having been issued in response to the network node functional unit receiving the control signalling; and
initiating said random access procedure with the backhaul hub.

19. The method according to claim 16, further comprising:
receiving a notification from the network node functional unit to interrupt the initiated random access procedure by not transmitting any L2 and/or L3 messages to the backhaul hub; and
interrupting said initiated random access procedure according to said received notification.

20. The method according to claim 16, wherein, if the backhaul client functional unit has established the communication link to the backhaul hub, the method further comprises:
receiving a notification from the network node functional unit to transmit a scheduling request, SR, or buffer status report, BSR, to the backhaul hub, wherein the notification has been issued in response to the network node functional unit having received the control signalling from the user equipment.

21. The method according to claim 20, further comprising:
wirelessly receiving a backhaul capacity grant from the backhaul hub, the backhaul capacity grant being based on actual and/or said predicted capacity need from all backhaul client functional units operatively connected to the backhaul hub.

22. The method according to claim 16, further comprising:
receiving a notification from the network node functional unit, the notification comprising a predicted backhaul capacity need, the predicted backhaul capacity need being based on the control signalling received by the network node functional unit and relating to a backhaul capacity need for transmitting user data from said backhaul client functional unit to said backhaul hub, which user data is to be transmitted using said uplink communications resource, wherein the notification has been issued in response to the network node functional unit having received said control signalling and prior to the network node functional unit having received user data corresponding to said control signalling from said user equipment on said uplink communications resource; and wirelessly transmitting the predicted backhaul capacity need to the backhaul hub.

23. The method according to claim 22, further comprising:

receiving a further notification from a further network node functional unit, the further notification comprising a further predicted backhaul capacity need, the further predicted backhaul capacity need being based on further control signalling received by the further network node functional unit and relating to a further backhaul capacity need for transmitting further user data from said backhaul client functional unit to said backhaul hub, wherein the further notification has been issued in response to the further network node functional unit having received said further control signalling and prior to the further network node functional unit having received said further user data corresponding to said further control signalling from at least one further user equipment; and determining the predicted backhaul capacity need to be wirelessly transmitted to the backhaul hub also based on said further predicted backhaul capacity need.

24. The method according to claim 16, wherein the at least one property of the communications link includes one of an amount of data to be transmitted, a bit rate, and a scheduling.

25. A network node for configuring a communications link, comprising:

a network node functional unit arranged to wirelessly receive control signalling from a user equipment, the control signalling relating to an uplink communications resource between the user equipment and the network node functional unit; and to notify, in response to receiving said control signalling and prior to receiving any user data associated with said control signalling from said user equipment on said uplink communications resource, a backhaul client functional unit to configure the communications link to a backhaul hub, wherein configuring the communications link includes changing at least one property of the communications link.

26. The network node according to claim 25, wherein the at least one property of the communications link includes one of an amount of data to be transmitted, a bit rate, and a scheduling.

27. A computer program encoded in a non-transitory computer-readable medium, for configuring a communications link, the computer program comprising computer program code which, when run on a network node functional unit, causes the network node functional unit to:

wirelessly receive control signalling from a user equipment, the control signalling relating to an uplink communications resource between the user equipment and the network node functional unit; and notify, in response to receiving said control signalling and prior to receiving any user data associated with said control signalling from said user equipment on said uplink communications resource, a backhaul client functional unit to configure the communications link to a backhaul hub, wherein configuring the communications link includes changing at least one property of the communications link.

28. The computer program according to claim 27, wherein the at least one property of the communications link includes one of an amount of data to be transmitted, a bit rate, and a scheduling.

29. A network node for configuring a communications link, comprising:

a backhaul client functional unit arranged to receive a notification from a network node functional unit to configure the communications link to a backhaul hub, wherein the notification was issued in response to control signalling wirelessly received by the network node functional unit from a user equipment, the control signalling relating to an uplink communications resource between the user equipment and the network node functional unit, the notification having been issued prior to the network node functional unit receiving any user data associated with said control signalling from said user equipment on said uplink communications resource; and to initiate configuration of said communications link to the backhaul hub, wherein configuring the communications link includes changing at least one property of the communications link.

30. The network node according to claim 29, wherein the at least one property of the communications link includes one of an amount of data to be transmitted, a bit rate, and a scheduling.

31. A computer program encoded in a non-transitory computer-readable medium, for configuring a communications link, the computer program comprising computer program code which, when run on a backhaul client functional unit, causes the backhaul client functional unit to:

receive a notification from a network node functional unit to configure the communications link to a backhaul hub, wherein the notification was issued in response to control signalling wirelessly received by the network node functional unit from a user equipment, the control signalling relating to an uplink communications resource between the user equipment and the network node functional unit, the notification having been issued prior to the network node functional unit receiving any user data associated with said control signalling from said user equipment on said uplink communications resource; and initiate configuration of said communications link to the backhaul hub, wherein configuring the communications link includes changing at least one property of the communications link.

32. The computer program according to claim 31, wherein the at least one property of the communications link includes one of an amount of data to be transmitted, a bit rate, and a scheduling.

* * * * *